United States Patent [19]

Dworatzek et al.

[11] Patent Number: 5,229,893
[45] Date of Patent: Jul. 20, 1993

[54] CIRCUIT APPARATUS FOR DERIVING SYNCHRONIZING PULSES FROM PLAYBACKS OF A VIDEO TAPE RECORDING

[75] Inventors: Manfred Dworatzek, Grosskotzenburg; Bernd Merkl, Nauheim; Rene Neumann, Heilbronn; Martin Seitz, Darmstadt, all of Fed. Rep. of Germany

[73] Assignee: BTS Broadcast Television Systems GmbH, Darmstadt, Fed. Rep. of Germany

[21] Appl. No.: 899,005

[22] Filed: Jun. 15, 1992

Related U.S. Application Data

[63] Continuation of Ser. No. 530,025, May 29, 1990, abandoned.

[30] Foreign Application Priority Data

May 31, 1989 [DE] Fed. Rep. of Germany ....... 3917666

[51] Int. Cl.$^5$ .............................................. H04N 5/78
[52] U.S. Cl. .................................. 360/38.1; 358/336; 358/155; 375/113
[58] Field of Search ............... 358/314, 336, 155, 339; 360/38.1, 36.2; 375/113

[56] References Cited

U.S. PATENT DOCUMENTS

| | | | |
|---|---|---|---|
| 4,313,129 | 1/1982 | Fukui | 360/38.1 X |
| 4,408,326 | 10/1983 | Takeuchi et al. | 358/314 X |
| 4,541,018 | 9/1985 | Watanabe | 358/314 |
| 4,736,238 | 4/1988 | Moriyama et al. | 358/314 X |
| 4,805,040 | 2/1989 | Oku et al. | 358/336 |

FOREIGN PATENT DOCUMENTS 2625775  12/1977  Fed. Rep. of Germany.
3444764C2  8/1987  Fed. Rep. of Germany.

OTHER PUBLICATIONS

Programmable Logic Design Guide, National Semiconductor Corporation, pp. 14–17, May 1986.
"Gal Data Book", published by Lattice Semiconductor Corp. cover page and pp. 2–15 (Feb. 1988).

Primary Examiner—Andrew L. Sniezek
Attorney, Agent, or Firm—Frishauf, Holtz, Goodman & Woodward

[57] ABSTRACT

Synchronizing pulses are separated from a video signal played back from a magnetic tape recording. The individual synchronizing pulses are then inspected in a digital inspection circuit containing two generic array logic (GAL) units and a counter, operating in conjunction with a gate pulse generated from a electrically programmable read-only memory (EPROM) which is controlled by a counter reset by every validated synchronizing pulse. The inspection is in terms of phase and width of the synchronizing pulse. The pulses that pass inspection are utilized for the playback of the video signal, as are also other timing signals generated by the EPROM. The detection of a dropout in the playback demodulator interrupts the provision of inspected synchronizing signals and also prevents false clamping of the final sync separator, but clock pulses driving the counter that addresses the EPROM, together with a reset signal from the EPROM, maintain certain timing signals during the dropout.

3 Claims, 2 Drawing Sheets

CIRCUIT APPARATUS FOR DERIVING SYNCHRONIZING PULSES FROM PLAYBACKS OF A VIDEO TAPE RECORDING

This application is a continuation of application Ser. No. 07/530,025, filed May 29, 1990, now abandoned.

CROSS-REFERENCE TO RELATED APPLICATION

Ser. No. 07/410,124, filed Sep. 29, 1989, now U.S. Pat. No. 5,003,392 Gerhard WISCHERMANN.

The invention concerns a circuit for deriving pulse signals locked into step with a synchronizing signal played back from a video tape recording, and more particularly a circuit of the kind that includes a clamping circuit for the video signal controlled by a coarse peak detection of the negative going synchronizing pulse to set the base d.c. level for clamping and a threshold circuit following the clamping circuit for more accurately separating synchronizing pulses from the video signal.

German Published Patent Application (OS) 26 25 775 shows a synchronizing pulse separation circuit for a composite television signal for use in a video recorder, in which the synchronizing pulses are separated from the composite television signal by means of a trigger circuit. The synchronizing pulses control two switches which are respectively provided for clamping and for providing the necessary blanking of the composite television signal.

German Patent 34 44 764 C2 discloses a pulse separating circuit having an operational amplifier with feedback coupling serving as the clamping stage. The clamping stage drives a following comparator for separating the synchronizing pulses in the video signal.

U.S. Pat. No. 4,491,870 shows a sync separator utilizing a counter that counts the pulses of a clock signal. The counter is reset by horizontal synchronizing pulses through an AND logic gate. A decoding device is connected to the output of the counter for deriving, from the input synchronizing signal, both a vertical synchronizing signal and a gate signal of the color synchronizing signal.

These known circuits are vulnerable to disturbance when there is a drop-out in the reproduced video signal. In such cases the pulse signals derived from the video signal played back from a magnetic tape exhibit errors which lead to erroneous segment switching or erroneous correction of timing errors.

SUMMARY OF THE INVENTION

It is an object of the present invention to provide circuit apparatus of the above-described kind that reliably evaluates the synchronizing pulses contained in the video signal and reacts insensitively to drop-out disturbances.

Briefly, clock pulses are generated at a frequency higher than the frequency of pulses of the separated synchronizing signal and are used for critically monitoring the pulse width and pulse timing of separated synchronizing signals. This pulse inspection circuit provides output pulses for the input pulses that pass muster. A digital phase control loop is provided for generating pulse signals for controlling the timing of various stages of video playback operation and for generating a time gate signal furnished to the monitoring circuit. The digital loop includes a programmable read-only memory (PROM) addressed by a counter and providing timing pulse outputs and feedback outputs. One of these feedback outputs provides the gate pulse for the pulse inspection circuit, and another serves to reset the counter through an OR gate to which the output pulses of the pulse inspection circuit are provided as a second input.

The circuit apparatus of the invention has the advantage that drop-out locations in the tape and disturbances caused by defective magnetic head-to-tape contact, which affect the video signal, have nearly no influence on the pulse signals, derived from the synchronizing signal. As a result of the immunity to error of the derivation of the pulse signals it is possible to carry out in a reliable way playback functions such as switching between the magnetic heads, clamping, amplification control, burst-gating or correction of timing errors.

It is particularly advantageous to utilize digital technology for producing the time critical circuit elements of the circuit of the invention, instead of monostable multivibrators or analog phase control loops, for example As a result of this feature the circuit apparatus of the invention is free of aging and temperature drift phenomena.

BRIEF DESCRIPTION OF THE DRAWINGS

The invention is further described by way of illustrative example with reference to the annexed drawing, in which.

DESCRIPTION OF THE ILLUSTRATED EMBODIMENT

Figure 1:
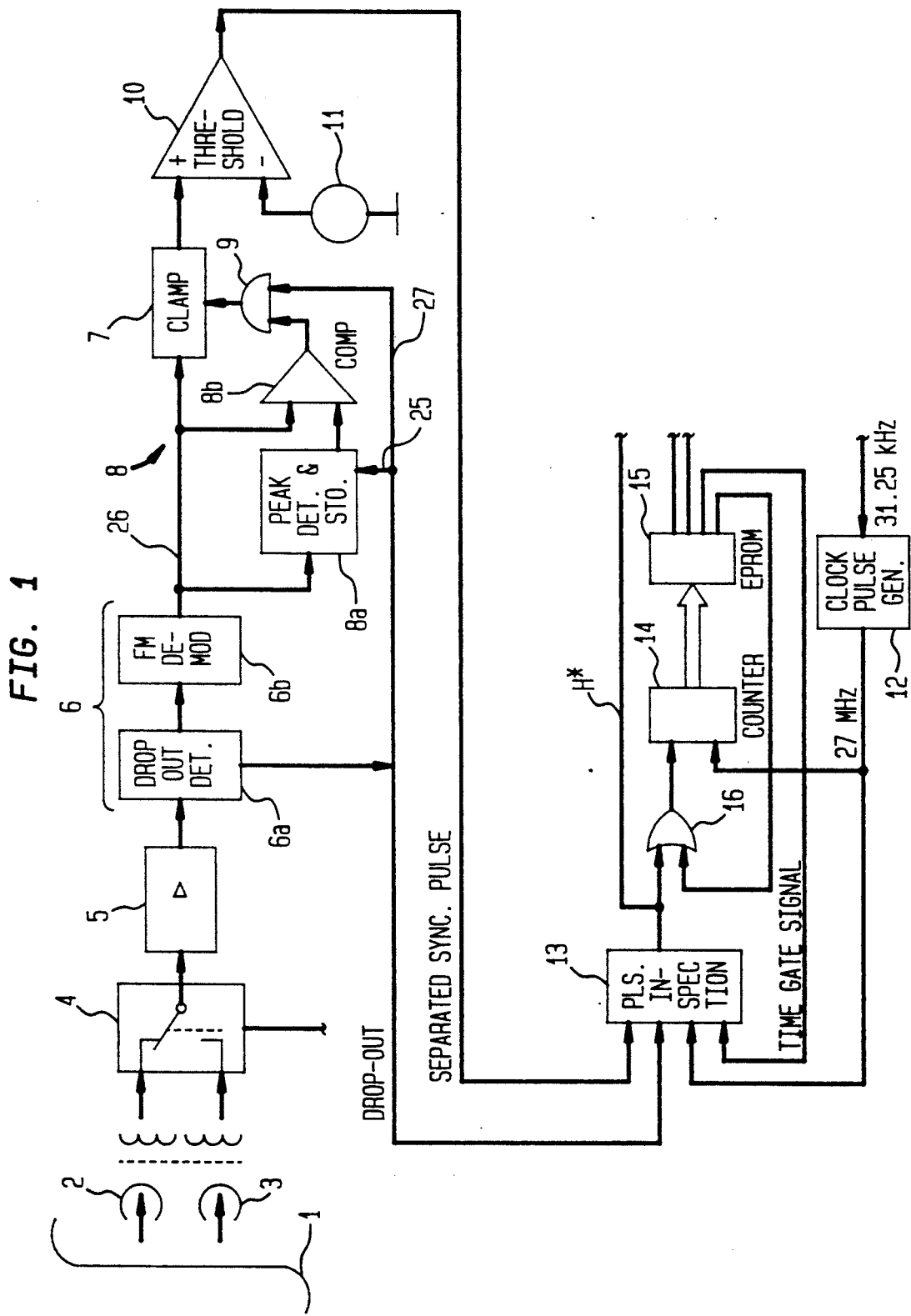
FIG. 1 is a block circuit diagram of an embodiment of circuit apparatus according to the invention.

FIG. 1 shows a magnetic tape 1 which is scanned by two magnetic heads 2 and 3 of a rotating scanning device (not shown) passing over tracks running obliquely to the edges of the magnetic tape. The magnetic tape is wound 180° around the device for rotary scanning, so that it is necessary to connect the magnetic heads 2 and 3 through a controlled change-over switch 4 with the input of a single preamplifier and corrective equalization stage for the signal picked up from the magnetic tape 1. The preamplifier stage 5 is followed by a stages 6a and 6b which are respectively, a drop-out detector 6a and a frequency demodulator 6b. The frequency demodulator 6b produces a demodulated video signal provided with first synchronizing pulses which appears on the connection line 2b, and the drop-out detector 6a produces a drop-out signal during signal interruptions of the FM signal. The drop-out signal is a logic voltage on the connection line 27.

The video signal thus obtained is supplied to a clamping stage 7 and at the same time to a coarse synchronizing pulses separation circuit 8. In the illustrated example the synchronizing pulse separating circuit 8 consists of a peak detector 8a producing the voltage value of the synchronizing base of the negatively directed synchronizing pulses. This voltage value serves as the reference level for a following comparator 8b that separates the synchronizing pulses from the composite video signal The separated synchronizing pulses are correlated logically with the drop-out signal in an AND stage 9 and then supplied as a clamping signal to the clamping stage 7. The demodulated video signal is clamped with reference to d.c. level to the synchronizing pedestal level by means of the clamping pulse signal. By means of the comparator 10 that follows the clamping stage 7 the synchronizing pulse signal is separated from the clamped video signal in a manner dependent upon the reference level of a reference voltage source 11 supplied to the comparator.

The synchronizing pulse separation in the comparator 10 operates more precisely than the synchronizing pulse separating circuit 8 that is provided for the generation of the clamping signal, so that timing errors in the video signal can be accurately determined with reference to the transition edges of the second synchronizing pulse signal produced by the comparator 10. In the normal operating condition, the synchronizing pulse separation circuit 8 and the comparator 10 deliver simultaneous pulses. In the case of disturbance, however, the peak detecting rectifier provided in the synchronizing pulse separating circuit 8 can be charged to a value so far negative that for a short while no synchronizing pulses can be separated. In order to prevent a drop-out in this case, the peak detecting rectifier 8a is controlled by the drop-out detector 6a through the drop-out signal supplied through the connection line 25 so as to store the previously determined voltage value during the drop-out interval. The clamping is also inhibited during drop-out, because the drop-out signal blocks the AND gate 9, but after the drop-out terminator the peak detector is still at a reasonable value of output.

The synchronizing pulse signal produced by the comparator 10 is then inspected for plausibility in accordance with the invention. For this purpose the synchronizing pulse signal is examined in relation to the pulses of a clock signal generated by a clock pulse generator 12. The clock signal in the illustrated example is coupled with the 864-fold multiple of the horizontal frequency of a high definition television (HDTV) video signal (1250-line system). For a line frequency of 31.25 kHz, the frequency of the clock signal is then 27 MHz.

For checking the pulse width and the pulse timing, the 27 MHz clock signal and the separated synchronizing signal are supplied to a pulse inspecting circuit 13. The circuit 13 contains a counter 22 (FIG. 2) for counting the pulses of the clock signal. The critical counting operation takes place during a gate pulse produced by the EPROM 15 from a phase regulation loop described below. Corresponding numbers of counted clock pulses determine the width and phase of each synchronizing pulse In the illustrated example, 20 pulses of the 27 MHz clock signal must arrive between the leading and trailing edge of a sync pulse in order to provide an evaluation of a valid synchronizing pulse. In this number a tolerance range is taken into account, the tolerance region relating to the asynchronism of the 27 MHz clock signal with respect to the picked-up video signal.

If during the counting interval a drop-out takes place, the counting operation is interrupted under control of the drop-out signal.

As mentioned above the pulse timing of the synchronizing pulses is also monitored, in this case by reference to the beginning of the gate pulse signal, having a defined time window, obtained from a digital phase regulating loop which consists of a second counter 14, a programmable read-only memory 15 (in the illustrated case a so-called EPROM) and an OR gate 16. The time window of the gate pulse signal defines the boundaries of the interval during which a synchronizing pulse can be expected in the synchronizing signal. The second counter 14 operating as an address counter counts the pulses of the 27 MHz clock signal. The address values obtained at the output of the counter 14 are then supplied over an address bus to the EPROM 15, at the output of which a multiplicity of pulse signals are made available which are coupled to the horizontal scanning frequency. Among others a pulse signal is produced by the EPROM 15 when a particular counter state is reached and is furnished through the OR gate 16 to the reset input of the counter 14 resetting it to a beginning address. In addition, the synchronizing pulses successfully checked for plausibility by the pulse inspection circuit 13 are also supplied through the OR gate 16 to the counter 14.

The accuracy of the circuit apparatus of the invention is determined by the clock frequency of a clock signal generated by the clock pulse generator 12 This accuracy is thus independent of temperature changes, aging or drift phenomena.

A synchronizing pulse signal checked for plausibility is needed for each of various playback circuits of a video tape equipment. The requirements of these playback circuits in respect to the synchronizing pulse signal are, however, quite different from each other. Synchronizing pulses that are used for derivation of a clamping signal must be suppressed in the blanking interval in the case of a drop-out, in order to prevent any clamping errors. The clamping signal is therefore conveniently derived from the synchronizing pulses $^H$tape supplied at the output of the pulse inspection circuit 13. Pulses which are needed for switching from one magnetic head to another, on the other hand, must be available even during a disturbed video signal. These pulses are most advantageously obtained from one or more outputs of the PROM 15. The PROM 15 is preferably of the EPROM type The same holds also for the pulses which are used for evaluation of timing errors in the time base error compensator.

Figure 2:
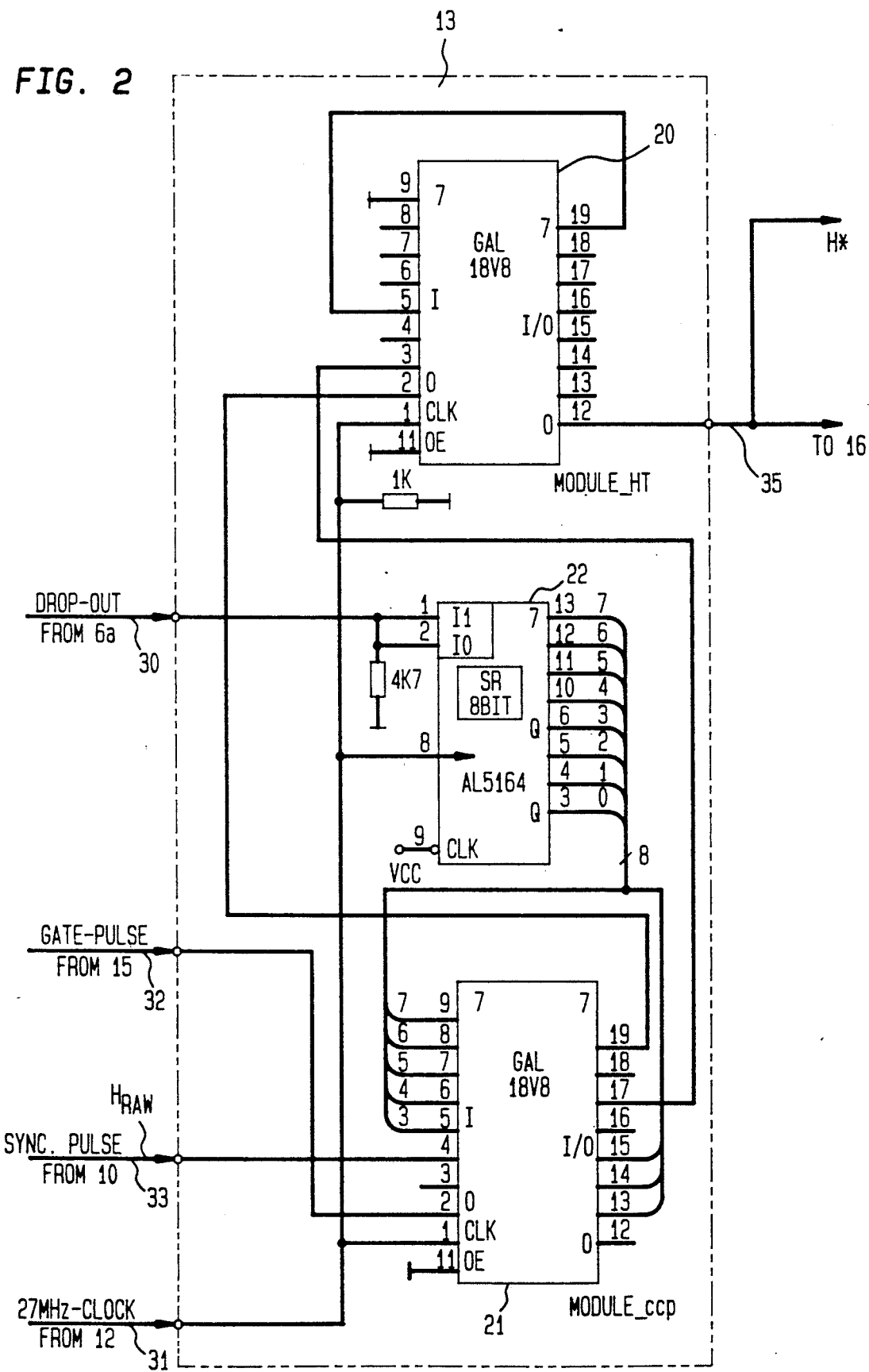
FIG. 2 is a more detailed block circuit diagram of the pulse inspection circuit shown in FIG. 1.

FIG. 2 illustrates an embodiment of the circuit 13 for critical inspection of the width and timing of synchronizing pulses, in order to determine whether a pulse may be passed on to the output as a plausible synchronizing pulse.

As shown in FIG. 2 the pulse inspection circuit 13 constituted of two programmable components of type GAL (generic array logic) programmed to provide a digital state machine for interrogating the position of the synchronizing pulses according to particular criteria. The digital phase regulation loop which contains the counter 14, the EPROM 15 and the OR gate 16 can also conveniently make use of programmed PAL and GAL components available from Lattice Semiconductor Corp. The latter differ from the PAL (programmable array logic) component available from National Semiconductor Corp. mainly in the output logic macrocells (OLMCs) of the GAL components.

FIG. 2 shows the implementation of the pulse inspection circuit 13 by means of GAL components.

A first GAL component 20, a second GAL component 21 and a shift register 22 provide all the necessary circuits for the pulse inspection circuit 13. The dropout signal comes on the connection 30 which is connected to the I1 and I0 connections for resetting the shift register 22. The 27 MHz clock signal is connected through the lead 31 which goes to the respective clock connections of the GAL units 20 and 21 and to a clock input of the shift register 22. The output state of the shift register 22 is connected through multiple connections to the GAL unit 21, which also receives the gate pulse from the EPROM 15 of FIG. 1 over the connection 32. The separated synchronizing pulse from the threshold circuit 10 of FIG. 1 is supplied over the connection 33 to pin 4 of the GAL unit 21. As a result of the logic of the GAL units and the connections shown, the time position within the gate pulse and the width of the pulse are evaluated with respect to a programmed counter in the GAL 20 which defines the aforementioned criteria.

The synchronizing pulses which pass inspection are furnished from pin 12 of the GAL unit 20, over the output connection 35

In designing the circuit such as the pulse inspection circuit 13 with the use of the components mentioned above, the usual practice is to set up a "truth table " or a set of Boolean equations defining the logic and then put these requirements into a program of a kind furnished by the manufacturer of the components for programming the logic of the components to meet these requirements. In the illustrated case the programming of the GAL unit 20, which is further identified in FIG. 2 as "module _HT" is usually expressed in the following notation:

TABLE I

```
module _HT;
flag '-r2', '-t1', '-f0';
title 'Plausibility test for separated H-sync pulse
HT33 DEVICE 'p16v8r';
L,H,Z,C,X = 0, 1,.Z., .C., .X.;
htir,do,doef pin 2,3,5; "doef = doc (external feedback)
doc,hti pin 19,18;
s1,s2,s3,s4,s5 pin 13,14,15,16,17;
hto pin 12;
clk ,oe,oec pin 1,11,9; "oec = enable for doc and hto (active low)
s = [s5,s4,s3,s2,s1];
enaout = [oe,oec]:
s1,s2,s3,s4,s5,hti ISTYPE 'pos,reg,feed_pin';
doc ISTYPE 'pos,com';
hto ISTYPE 'pos';
equations
!enable hto = oec;
!enable doc = oec;
hti := htir # !doef;
doc = do & doef
      # htir;
state diagram s
state 0: hto = 0;
    IF hti == 0 THEN 1
        ELSE 0;
state 1: IF hti == 0 THEN 2
        ELSE 0;
state 2: IF hti == 0 THEN 3
        ELSE 0;
state 3: IF hti == 0 THEN 4
        ELSE 0;
state 4: IF hti == 0 THEN 5
        ELSE 0;
state 5: IF hti == 0 THEN 6
        ELSE 0
state 6: IF hti == 0 THEN 7
        ELSE 0;
state 7: IF hti == 0 THEN 8
        ELSE 0;
state 8: IF hti == 0 THEN 9;
        ELSE 0;
state 9: IF hti == 0 THEN 10
        ELSE 0;
state 10: IF hti == 0 THEN 11
        ELSE 0
state 11: IF hti == 0 THEN 12;
        ELSE 0;
state 12: IF hti == 0 THEN 13
        ELSE 0;
state 13: IF hti == 0 THEN 14
        ELSE 0
state 14: IF hti == 0 THEN 15;
        ELSE 0;
state 15: IF hti == 0 THEN 16;
        ELSE 0;
```

TABLE I-continued

```
state 16: IF hti == 0 THEN 17;
        ELSE 0;
state 17: IF hti == 0 THEN 18
        ELSE 0;
state 18: IF hti == 0 THEN 19;
        IF hti == 1 & do == 0 THEN 0
        ELSE 19;
state 19: if hti == 1 & do == 1 then 20
        else 0;
state 20: hto = 1
        goto 21;
state 21: hto = 1;
        goto 22
state 22: hto = 1;
        goto 0;
state 23: goto 0;
state 24: goto 0;
state 25: goto 0;
state 26: goto 0;
state 27: goto 0;
state 28: goto 0;
state 29: goto 0;
state 30: goto 0;
state 31: goto 0;
end _HT
```

The programming of the GAL unit 21, which is also given the legend "module ccp" in FIG. 2, is conventionally described as follows:

TABLE II

```
module ccp;
flat '-t1', '-f0';
title 'Conditioned clamp pulse correlation of clamp pulse with
    drop-out and plausibility pulse
cc]10 DEVICE 'p16V8r';
L,H,Z,C,X = 0, 1,.Z., -C., .X.;
clk, oe pin 1,11;
plau,seg,ht2 pin 2,3,4;
doi0,doi1,doi2,doi3,doi4,doi5,doi6,doi7 pin 13,14,15,5,6,7,8,9;
lh,clk 13,do_out,mfcl,ht_out pin 12,16,17,18,19;
ht_out,do_out,mfel,lh ISTYPE 'com';
doi = [doi0,doi1,doi2,doi3,doi4,doi5,doi6,doi7];
output = [mfcl,lh,do out,ht out];
EQUATIONS
    clk 13 := !clk 13;
    do out = !doi0 & (doi2 # !doi2) & (doi1 # !doi1);
    ht ut = doi0 # plau # ht2;
    mfcl = !doi0 & !doil & !doi2 & !doi3 & !doi 4 & !doi5 & !doi6 &
        !doi 7 & !plau & !seg;
    lh = !doi0 & !doil & !doi2 & !doi3 & !doi 4 & !doi5 & !doi6 &
        !doi7 & !seg;
end ccp.
```

The analog circuits which precede the digital circuits of the pulse inspection circuit 13 are preferably provided with a ground separate from the ground for the digital circuits to avoid undesirable interaction through a common ground. The complete implementation of the analog circuits of FIG. 1 is well known in the art and does not need to be described in further detail here.

Although the invention has been described with reference to a particular illustrative example, it will be recognized that modifications and variations are possible within the inventive concept.

We claim:

1. A circuit for deriving output timing pulse signals locked into synchronism with valid portions of a synchronizing signal obtained from playback of a video signal recorded on a magnetic tape recording medium, comprising:
    amplifier means (5) for amplifying said video signal as played back from the tape record medium and having an output for an amplified video signal;

a drop-out detector (6a) and a demodulator (6b) connected to said output for said amplified video signal and respectively having outputs for a drop-out signal and for a demodulated video signal;

a clamping circuit (7-9) for said demodulated video signal having an input connected to said output of said demodulator, having an output for providing a clamped video signal, having a clamping control input and including means (8a, 8b, 9) of said clamping circuit responsive to said demodulated video signal for obtaining a first synchronizing signal during playback of said video signal and for supplying said first synchronizing signal to said clamping control input as a clamp timing signal;

circuit connection means (27) connected to said drop-out signal output of said drop-out detector (6a) and connected to said means (8a, 8b, 9) of said clamping circuit for obtaining said first synchronization signal and supplying it as said clamp timing signal, for preventing, by blocking the supply of said first synchronizing signal, the provision of an erroneous clamping operation during a drop-out;

threshold circuit means (10), having an output and having an input connected for receiving said clamped video signal from said output of said clamping circuit (7-9), for separating a second synchronizing signal from said clamped video signal and providing the separated second synchronizing signal at said threshold circuit output;

circuit means (12) for generating clock pulses at a frequency higher than the frequency of said separated second synchronizing signal;

pulse inspection circuit means (13) for inspecting pulse width and pulse timing of pulses of said separated second synchronizing signal and having a first input for receiving a time gate signal, a second input for said generated clock pulses, a third input connected to said output of said threshold circuit (10) for receiving said separated second synchronizing signal, and an output for output pulses which are those pulses of said separated second synchronizing signal that pass inspection criteria for pulse width and pulse timing;

a digital phase control loop, including said pulse inspection circuit mean (13), for generating said output timing pulse signals and for generating said time gate signal and having as inputs of said loop said first, second and third inputs of said pulse inspection circuit means (13), said digital phase control loop also including programmable read-only memory means (15) having inputs, having outputs which are outputs of said loop for supplying timing pulse signals generated by said loop and having an output supplying said time gate signal which is fed back to said pulse inspection circuit means (13) and a feedback pulse output for supplying a feedback pulse, said digital phase control loop also including a feedback-coupled counter (14) connected for counting pulses generated by said clock pulse generating circuit means (12), and having outputs connected to inputs of said programmable read-only memory means (15), having also a reset input, said digital phase control loop further including means (16) connected to said reset input for resetting said counter (14) in response either to a timing pulse (H*) from said output of said pulse inspection circuit means (13) or to said feedback pulse from said feedback pulse output of said programmable read-only memory means (15), said output of said pulse inspection circuit means thereby providing an additional timing pulse signal of said loop.

2. A circuit according to claim 1, wherein said pulse inspection circuit means (13) has a fourth input for said drop-out signal, connected to said drop-out signal output of said drop-out detector (6a), for preventing the furnishing of an output synchronizing pulse at said output of said pulse inspection circuit means (13) during the presence of a drop-out detected by said drop-out detector (6a), said output of said pulse inspection circuit means being connected to said reset input of said counter (14) through an input of an OR gate (16) which is provided with a second interconnected to said feedback pulse output of said programmable read-only memory means (15), said OR gate being said means for resetting said counter (14) in response either to a timing pulse (H*) of said pulse inspection circuit means or a feedback pulse from said programmable read-only memory means (15).

3. A circuit according to claim 1, wherein said frequency of said generated clock pulses produced by said clock pulse generating circuit means is at least 100 times higher than the frequency of pulses of said separated first and second synchronizing signals.

* * * * *